United States Patent [19]

Abbink et al.

[11] Patent Number: 4,987,780
[45] Date of Patent: Jan. 29, 1991

[54] INTEGRATED ACCELEROMETER ASSEMBLY

[75] Inventors: Henry C. Abbink, Westlake Village; Nicholas F. Pier, Thousand Oaks, both of Calif.

[73] Assignee: Litton Systems, Inc., Beverly Hills, Calif.

[21] Appl. No.: 121,088

[22] Filed: Nov. 16, 1987

[51] Int. Cl.[5] .................. G01P 15/08; G01P 15/13
[52] U.S. Cl. .................................................. 73/517 B
[58] Field of Search .............. 73/514, 517 R; 310/329

[56] References Cited

U.S. PATENT DOCUMENTS

| | | | |
|---|---|---|---|
| Re. 31,459 | 12/1983 | Block | 338/47 |
| 3,498,138 | 3/1970 | Stewart | 73/517 B |
| 3,590,289 | 6/1971 | Ostwald | 310/329 |
| 3,636,387 | 1/1972 | Hatschek | 310/329 |
| 3,702,073 | 11/1972 | Jacobs | 73/517 |
| 3,794,236 | 2/1974 | Salzer et al. | 228/1.1 |
| 3,805,097 | 4/1974 | Yanchich et al. | 310/329 |
| 3,884,085 | 5/1975 | Beckman et al. | 73/517 R |
| 3,897,690 | 8/1975 | Hanson | 73/517 B |
| 3,909,924 | 10/1975 | Vindasius et al. | 437/8 |
| 3,953,920 | 5/1976 | Endo | 29/592.1 |
| 4,021,766 | 5/1977 | Aine | 338/2 |
| 4,071,838 | 1/1978 | Block | 338/47 |
| 4,075,525 | 2/1978 | Birchall | 310/329 |
| 4,088,026 | 5/1978 | Flanner | 73/497 |
| 4,104,920 | 8/1978 | Albert et al. | 73/517 AV |
| 4,129,042 | 12/1978 | Rosvold | 73/727 |
| 4,144,516 | 3/1979 | Aine | 338/2 |
| 4,169,384 | 10/1979 | Flanner et al. | 73/516 R |
| 4,182,187 | 1/1980 | Hanson | 73/517 B |
| 4,186,324 | 1/1980 | Hartzell, Jr. | 310/329 |
| 4,188,258 | 2/1980 | Mounteer et al. | 156/628 |
| 4,202,089 | 5/1980 | Ljung | 29/527.6 |
| 4,204,185 | 5/1980 | Kurtz et al. | 338/4 |
| 4,250,757 | 2/1981 | Hanson | 73/517 B |
| 4,378,510 | 5/1983 | Bennett | 310/329 |
| 4,400,979 | 8/1983 | Hanson et al. | 73/517 B |
| 4,649,748 | 3/1987 | Fukano et al. | 73/517 R |
| 4,748,848 | 6/1988 | Scholl et al. | 73/517 B |
| 4,779,463 | 10/1988 | Woodruff | 73/517 R |
| 4,788,864 | 12/1988 | Pier | 73/517 B |

FOREIGN PATENT DOCUMENTS

| | | |
|---|---|---|
| 140334 | 5/1985 | European Pat. Off. . |
| 1011433 | 12/1965 | United Kingdom . |
| 1149491 | 4/1969 | United Kingdom . |
| 2047902 | 12/1980 | United Kingdom . |
| 2123496 | 2/1984 | United Kingdom . |

OTHER PUBLICATIONS

U.K. Search Report for British patent application Ser. No. 8916067.
"Silicon Micromechanical Devices", Angell et al., pp. 44–55.

Primary Examiner—Ian J. Lobo
Attorney, Agent, or Firm—Elliott N. Kramsky

[57] ABSTRACT

An assembly for use in a dry accelerometer. The assembly includes a flat ceramic base with an interior aperture, two metal hinges and a pendulous mass supported within the aperture by such hinges. A light emitting diode and photodetector are provided for measuring movement of the pendulous mass. The assembly is readily fabricated and tested with batch processes.

7 Claims, 2 Drawing Sheets

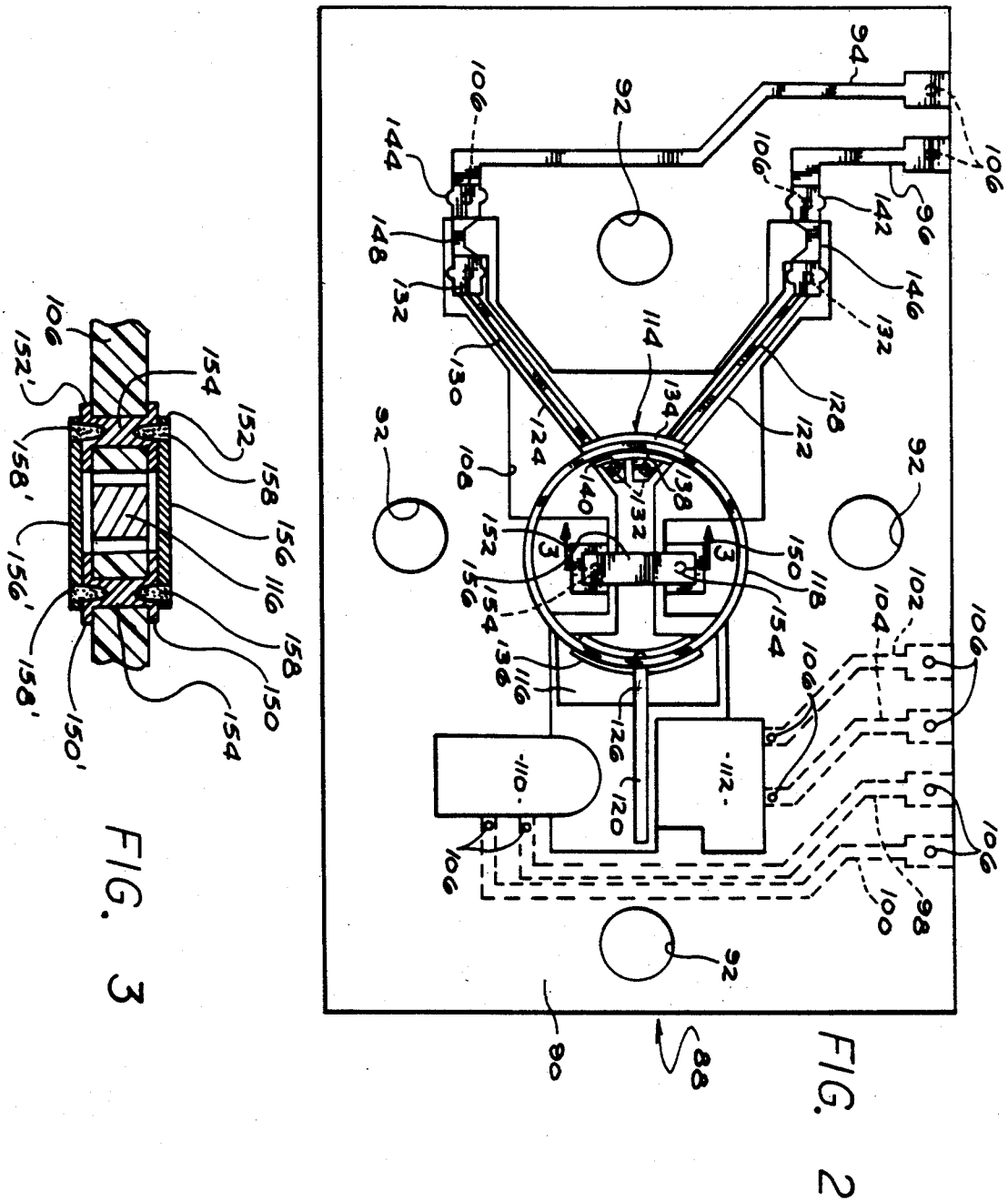

INTEGRATED ACCELEROMETER ASSEMBLY

BACKGROUND

1. Field of the Invention

The invention relates to dry accelerometers of the pendulous mass type used in inertial navigation systems. More particularly, this invention pertains to an integrated accelerometer assembly.

2. Description of the Prior Art

Dry closed loop accelerometers of the hinged, pendulous mass type have substantially replaced floated accelerometers in modern strapdown inertial navigation systems due to the smaller volume, lighter weight and simplified construction that they offer. Functionally, a common type of single-axis dry accelerometer comprises a pendulous mass that is suspended within a housing by flexure type hinges. When subjected to acceleration, the mass pivots or rotates about the hinge axis to thereby shutter the output of a light emitting diode conventionally located adjacent the mass' non-pivotal or free end. This is detected by a photodetector circuit. The photodetector circuit produces an output signal that is proportional to the sensed acceleration. Such signal is amplified and the resultant current is applied to a torquer coil that is mounted to the pendulous mass. The coil reacts with a permanent magnet that is affixed to the housing to return the mass to a substantially neutral (null) position. The torquing current thereby provides a measure of the input acceleration.

While the foregoing arrangement of a dry accelerometer may provide excellent performance in a relatively small package, its manufacture requires intensive manual assembly and adjustment resulting in substantial cost. The conventional design includes minute components which are attached by Epoxy or solder in processes that require highly dextrous and skilled personnel. The Epoxy bonds that attach the pendulous mass to the housing tend to "creep" over time, resulting in critical misalignment that can effectively limit the instrument's life as it can acquire undesirable sensitivity to off-axis accelerations.

SUMMARY

The foregoing and additional shortcomings of the prior art are addressed and overcome by the present invention that provides an integrated accelerometer. Such an accelerometer includes a planar support base that has a central aperture. A pendulous mass includes two arms. A pair of spaced flexible hinges is provided, a first end of each of which is welded to the support base and a second end of each of which is welded to the pendulous member to pivotally support the pendulous member within the aperture. The accelerometer includes a pair of limit stops that are welded to opposed sides of the support base to limit the movement of the pendulous member. The support base includes a plurality of copper filled apertures for anchoring the hinge welds and the limit stop welds and the pendulous member includes a plurality of copper filled apertures for anchoring the hinge welds.

The foregoing and additional advantages and features of the present invention will become apparent from the detailed description of the invention that follows. This description is accompanied by a set of drawing figures. Numerals point out the various features of the invention in the figures and in the detailed description, like numerals referring to like features throughout.

BRIEF DESCRIPTION OF THE DRAWINGS

FIG. 2 is a top plan view of an accelerometer assembly in accordance with this invention; and, FIG. 3 is an enlarged partial cross-sectional view taken along section line 3—3 of FIG. 2 which provides additional detail with regard to the weld joints of the invention.

DETAILED DESCRIPTION

Figure 1:
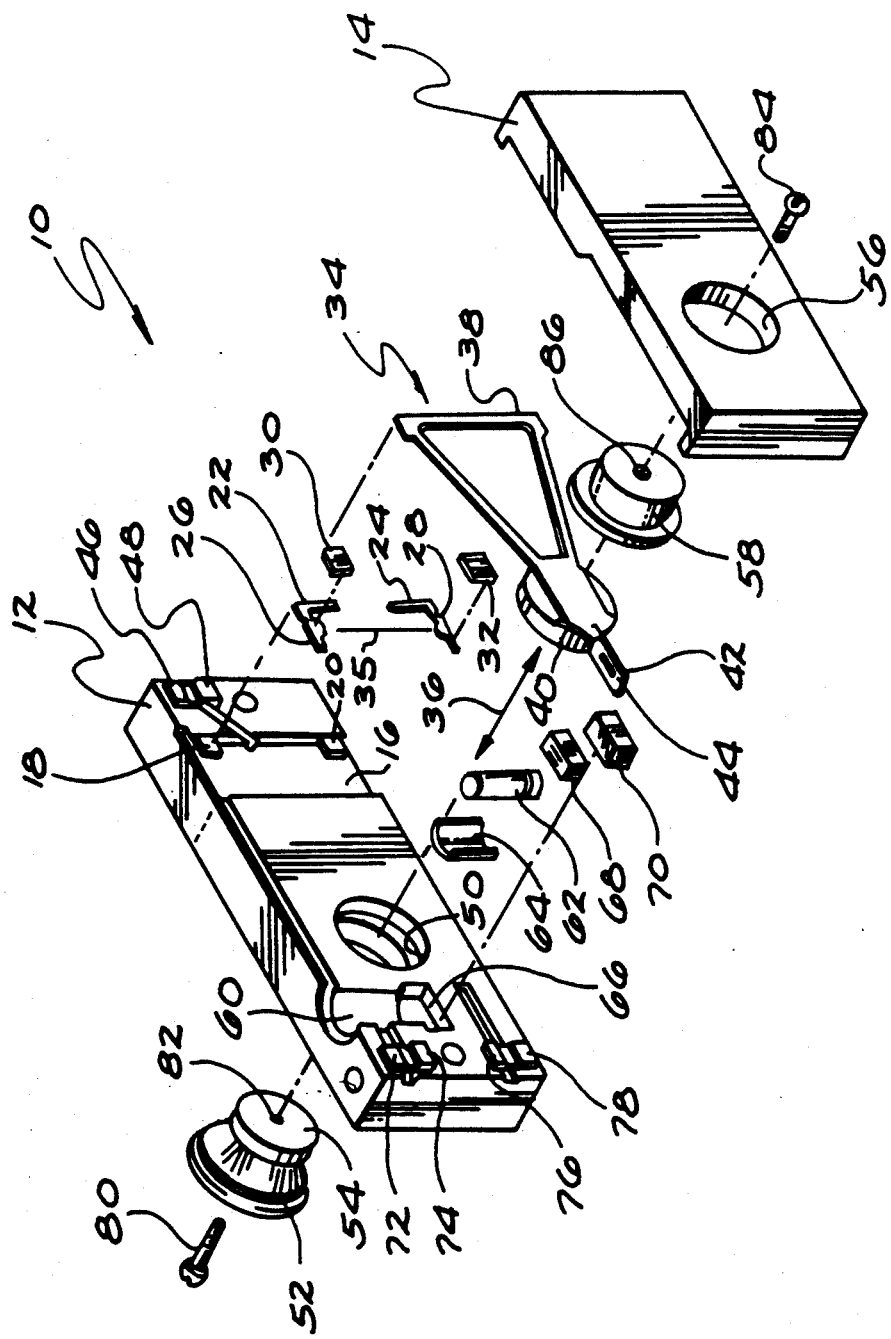
FIG. 1 is an exploded perspective view of a common dry closed-loop accelerometer assembly in accordance with the prior art.

FIG. 1 is an exploded perspective view of a common dry accelerometer assembly 10 of the prior art. The accelerometer control electronics, not shown, includes circuitry for exciting a light-emitting diode, amplifying and conditioning the outputs of a photodetector, generating a torque restoring current and the like. The details, arrangement and design of such control circuitry is well known in the art. As is seen, the assembly 10 comprises a complex assembly of numerous parts requiring precision machining and assembly.

The assembly 10 includes a support frame 12 and cover 14, each preferably of a suitable metal such as magnetically soft steel. The block-like frame 12 includes a recessed rectangular portion 16 at its interior surface wherein rectangular spacers 18, 20 are affixed as shown. "L" shaped hinges 22 and 24 of spring steel or like material are attached to the spacers 18 and 20 respectively. One side of each of the hinges 22 and 24 includes a notch, 26 and 28 respectively, to facilitate flexure. Rectangular spacers 30 and 32 are attached to the opposed surfaces of each of the hinges 22 and 24 and sandwich the notches 26 and 28 therebetween.

A pendulous mass 34 is attached to the spacers 30, 32. The mass 34 is free to rotate about an axis 35 that connects the hinge notches 26, 28. The spacers 18, 20, 30 and 32 are formed of insulating material, thereby providing electrical isolation between the frame 12, the hinges 22, 24 and the mass 34. As will become apparent, the hinges 22, 24 act as electrical conductors that provide current to a torque restoring coil.

The spacers 18 and 20, the hinges 22 and 24, the spacers 30 and 32 and the mass 34 are preferably secured as shown by Epoxy or like adhesive, requiring a manually-operated support fixture to attain the critical precise alignment of the mass 34 with the accelerometer input axis 36. During such precision assembly process the hinges 22 and 24 are easily bent, necessitating detailed disassembly followed by reassembly with a replacement hinge. Misalignments occurring during such processes may be compensated by the control electronics. However, such compensation provides only a temporary solution. With time, the adhesive that secures the spacers and the hinges of the prior art assembly tends to creep, gradually misaligning the pendulous mass 34.

The mass 34 comprises a generally triangular-shaped strut 38, a round torquer coil 40 and a rectangular shadow paddle 42. Both the strut 38 and the paddle 42 are of a non-magnetic material such as aluminum. The paddle 42 includes an elongated central aperture 44, the purpose of which is discussed below. The coil 40 (isolated from the strut by a nonconductive spacer) and the paddle 42 are secured to the strut 38 by Epoxy or like adhesive and includes two electrical leads (not shown). Each of such leads is connected by a wire (not shown) to the pivotal end of one of the hinges 22, 24. The opposed end of each hinge 22, 24 is connected by a wire (not shown) to an end of a terminal board 46, 48 that is fixed to the frame 12 and which, in turn, is in electrical connection with the accelerometer control electronics. All electrical connections require hand soldering and the resulting flux residue must be carefully removed to prevent potentially-catastrophic contamination of the prior art assembly 10.

A relatively large, generally-circular cavity 50 is provided in the frame 12 opposite the coil 40. A permanent magnet 52 having a cylindrical, soft iron pole piece 54 is proportioned and located within the cavity 50 so that an open annular space is provided between the circumference of the pole piece 54 and the interior surface of the cavity 50. The resulting space minimizes the leakage of magnetic flux into the soft iron return path of the frame 12. A circular bore 56 in the cover 14 is provided for soldering a non-magnetic insert 58 thereto. The insert 58 further facilitates magnetic interactions by minimizing flux leakage.

A semi-cylindrical aperture 60 is provided for receiving a light emitting diode 62. The diode 62 is electrically isolated from the frame 12 by a semi-cylindrical sleeve 64 of nonconductive material positioned within the aperture 60. An irregularly shaped cavity 66, adapted to receive a photodetector 68 and a backing block 70, is located opposite the diode 62 within the frame 12. When assembled, the shadow paddle 42 of the pendulous mass 34 is positioned between the diode 62 and the photodetector 68. The diode 62, the sleeve 64, the photodetector 68 and the block 70 are secured by manual application of an appropriate adhesive such as Epoxy. Such a process further requires the skilled usage of a position adjustment fixture. The wire conductors (not shown) that connect the diode 62 to terminal boards 72, 74 and those that connect the photodetector 68 to terminal boards 76, 78 are manually soldered into place by skilled technicians.

A limit stop 80, threaded into hole 82 of the magnet 52 and the pole piece 54, and a limit stop 84, threaded into hole 86 of the insert 58, provide protection from excessive acceleration forces. The stops 80 and 84 may be adjusted so that the free end of the mass 34 cannot contact either the frame 12 or the cover 14. All adjustments for prevention of damage to the assembly require precise manual operations. Only after all the components have been assembled and the required adjustments made can the cover 14 be soldered to the frame 12.

In operation, the elongated aperture 44 of the paddle 42 "transmits" (shutters) a beam of light emitted by the diode 62 toward the photodetector 68. As the pendulous mass 34 is deflected along the sensing axis 36 in response to an acceleration force, the paddle 42 will disrupt or shutter such beam with respect to the photodetector 68. Transistors within photodetector 68 are responsive to the amount of the detected light. The resulting currents are processed by the accelerometer control electronics and a restoring current is provided to the coil 40. As is well known in the art, the cooperative action of the coil 40 and the magnet 52 acts to restore the mass 34 to its null position. The amount of current required to restore the mass 34 provides a measure of the input acceleration.

Thus it is seen that the known accelerometer assembly of the prior art accelerometer requires not only numerous precision machined elements but extensive manual assembly operations followed by complex adjustments. Further, the instrument degrades over time as a result of Epoxy creep that results in the loss of accuracy and can result in the failure of the device through the detachment of critical elements.

FIG. 2 is a top plan view of an integrated accelerometer assembly 88 in accordance with the invention. The assembly 88 of the invention is capable of performing all functions of the prior art assembly of the preceding figure. As will be apparent from the discussion of its process of manufacture, the assembly 88 may be formed as one of a large number of integrated accelerometer assemblies that can be tested simultaneously by automatic test equipment.

The assembly 88 includes a rectangular plate 90 of suitable material such as sintered aluminum oxide that supports and provides electrical isolation for the accelerometer elements. Holes 92 in the plate 90 permit attachment to a housing that may also hold the accelerometer's permanent magnet.

Metal conductors 94 and 96 are formed upon the top surface of the plate 90 while conductors 98, 100 and 102, 104 may be formed upon its opposite surface. Such conductors provide electrical connection between the assembly components and conventional accelerometer control electronics. Thus, the need for discrete wire conductors, and the attendant problems of the illustrated prior art assembly, are eliminated. Representative methods for forming the conductors 94, 96, 98, 100, 102 and 104 include screening with gold ink (and subsequent firing), electroless copper coating, and photoresist and etching processes.

Holes 106 are provided near the ends of the aforementioned conductor paths. Each of the holes 106 is filled with a metal such as copper by such methods as electrodepositing, screening (and subsequent firing), and the like. The electrodepositing includes placing an electrode plate on one side of the plate 90 and exposing the other side to copper plating solution. The holes 106 provide solid metallic anchors for subsequent component connections. The resultant connections are thereby protected from delamination.

An irregularly-shaped aperture 108 is provided in the central area of the plate 90. A diode 110 and a photodetector 112 are attached to the plate 90 by means of Epoxy or other suitable material and situated within the aperture 108. Unlike the intricate three dimensional assembly required by the prior art as represented by the previous figure, the substantially-planar configuration of the assembly 88 of the invention generally allows accurate and straightforward positioning of necessary components by means of known efficient programmable machinery (or tooling).

The diode 110 includes electrical leads. Each lead (not shown) is affixed to one of the conductors 98, 100 by ultrasonic or thermocompression automated wire bonding or soldered. Similarly, the leads (not shown) of the photodetector 112 are bonded or soldered to the conductors 102, 104. Such bonding processes can replace the time-consuming and expensive manual soldering and flux residue removal of the prior art accelerometer discussed above.

A pendulous mass 114 comprising a strut 116, a circular torquer coil 118 and a flat rectangular shadow paddle 120 with an elongated central aperture (not shown) is also positioned within the irregularly-shaped aperture 108. The strut 116, preferably formed of the same material as the plate 90, includes radially-directed arms 122, 124. An elongated aperture 126 is located at the opposed end of the strut 116 for attachment of the paddle 120.

Metal conductors 128 and 130 are formed upon the arms 122 and 124 respectively of the strut 116. The conductors 128, 130 and strut 116 may be of different thermal expansion coefficients. However, such differences, which could otherwise result in the bending of the strut 116 and result in inaccurate measurements, are compensated by forming identical metal conductors onto the opposed surfaces of the arms 122 and 124. Such conductors are formed in like manner to the conductors 94, 96, 98, 100, 102 and 104. Holes 132 near the ends of the conducting paths are filled with copper (as described above with regard to the holes 106) thereby providing solid anchors for subsequent component connections.

The torquer coil 118 rests atop spacers 134, 136 of nonconductive, preferably ceramic material which provide electrical isolation from electrical conductors 128, 130 and permit movement of the mass 114 without contact between the coil 106 and the plate 90. The coil 106, the paddle 120 and the spacers 134, 136 are mechanically positioned and secured by appropriate adhesive such as Epoxy. The coil 106 includes electrical leads 138, 140 which are attached to the conductors 128, 130, respectively, by the above referenced wire bonding process or soldered.

Metal hinges 142 and 144, each including a central notch 146, 148 respectively support the pendulous mass 114 for angular deflection relative to the plate 90. The irregularly shaped hinges 142, 144 are preferably formed of spring steel. One end of the hinge 142 is connected to the plate 90 atop the conductor 96 while the other end is connected to the arm 122 of the strut 116 that overlies the conductor 128. Likewise, one end of the hinge 144 is connected to the plate 90 atop the conductor 94 while the other end is connected to the arm 124 of the strut 116 overlying the conductor 130. The hinges 142, 144 can be automatically attached as shown by an appropriate welding process such as that of the laser or capacitive discharge type. The holes 106 and 132 beneath the respective weld points prevent the hinges from detachment from the plate 90.

Limit stop spacers 150 and 152, formed simultaneously with and in the same manner as the metal conductors discussed above, are located on the surface of the plate 90 at the edges of the aperture 124. Limit stop spacers are formed at the corresponding locations on the opposed surface of the plate 90. Holes 154, filled with copper (to anchor components discussed below) are located beneath the spacers 150 and 152 as shown. Subsequent to initial formation, the spacer depths are increased by copper electroplating. In an actual embodiment, the thickness of the limit stop spacers was 0.0005 inches.

A rectangular limit stop 156 of appropriate metal such as spring steel, is welded onto the surface of the plate 90 concurrent with the installation of the hinges 142, 144. An end of the limit stop 156 is welded to spacer 150 while the other end is welded to spacer 152 so that the stop 156 spans the aperture 108. Once welded into position, the limit stop 156 requires no additional adjustment. Similarly, a limit stop is welded at the corresponding location on the opposed surface of the plate 90.

Functionally, the limit stop 156 performs in the same manner as that of the prior art. That is, movement of the strut 116 is limited by its contact with the limit stop 156.

FIG. 3 is an enlarged partial cross-sectional view taken along the line 3—3 of FIG. 2 and illustrating typical weld joints of this invention. The weld joints secure the hinges and the limit stops to the plate 90. A weld nugget 158 is formed at each weld joint. As can be seen, the nuggets 158 extend into the copper-filled holes 154 and thereby provide solid anchors for the welds. Thus, the welds are prevented from delaminating from the plate 90 when the assembly is subjected to normal environmental vibrational forces, increasing the reliability of the sensing assembly.

The batch process for forming a large number of accelerometer assemblies includes the application of a number of processing steps to a relatively large piece of nonconductive material. For example, one embodiment utilized a 4.5 inch square piece of ceramic to form forty (0.5 by 0.8 inch) assembly plates. The surfaces of the material are ground parallel by conventional processes to a thickness of 0.01 to 0.03 inches. Thereafter the outer edges of the plates (of the assemblies) are laser scribed for later separation. Following such definition of the individual assembly plates, each plate is laser cut and drilled to form the central aperture, strut, and anchor holes. Portions of the strut edges are left connected to the plate until final assembly and preliminary testing is completed. In this way the strut and hinges are protected from damage during the assembly of the unit. Alternatively, the plate can be molded in the green state and subsequently fired, injection molded, or formed of photosensitive glass, such as that which is commonly available from Corning under the Trademarks "FOTOFORM" or "FOTOCERAM" which may be etched rather than laser cut. After the anchor holes have been fille with copper, the plate is lapped flat. The conductors and spacers are then formed upon the plate as described above and the depths of the spacers are increased by copper electroplating. Next, the diode, the photodetector, the coil and spacers, and the paddle are fixed by appropriate adhesive and the electrical components connected to the conductors. Finally, the hinges and the limit stops are welded.

Thus it is seen that there has been brought to the art a compact and integrated accelerometer assembly. By utilizing the teachings of the invention, one may easily manufacture a large number of high reliability assemblies at a reduced cost. Many assemblies may be simultaneously tested on the common substrate. The assembly takes maximum advantage of efficient programmable machinery to minimize the amount of manual effort, and hence man-hours, required.

While this invention has been described in its preferred embodiment, its scope is not limited thereto. Rather it is only limited insofar as defined in the following set of claims and such scope includes all equivalents thereof.

What is claimed is:

1. An integrated accelerometer comprising, in combination:
   (a) a planar support base having a central aperture;
   (b) a pendulous member including two arms;
   (c) a pair of spaced flexible hinges, a first end of each of said hinges being welded to said support base and a second end of each being welded to one of said arms whereby said pendulous member is pivotally supported within said aperture (d) a pair of limit stops welded to opposed sides of said support base for limiting the movement of said pendulous member; and (e) said support base includes a plurality of copper filled apertures for anchoring said hinge welds and said limit stop welds and said pendulous member includes a plurality of copper filled apertures for anchoring said hinge welds.

2. An integrated assembly as defined in claim 1 wherein said apertures are filled with copper.

3. An integrated assembly as defined in claim 1 wherein said plate and said pendulous member are formed of sintered aluminum oxide.

4. An integrated assembly as defined in claim 3 wherein said pendulous member further comprises:

(a) a torquer coil; and (b) metal conductors plated on the surface of said arms of said pendulous member, said conductors being in electrical connection with said coil.

5. An integrated assembly as defined in claim 4 further including:

(a) a light emitting diode mounted in said base;

(b) a photodetector mounted in said base and spaced apart from said diode; and (c) said pendulous member includes a shadow paddle disposed between said diode and said photodetector for disrupting a beam from said diode.

6. An integrated assembly as defined in claim 5 wherein said support base further includes metal conductors at its opposed surfaces being in electrical connection with said coil, said diode and said photodetector.

7. An integrated assembly as defined in claim 6 wherein said metal conductors of said pendulous member and said metal conductors of said base are formed of copper.

* * * * *